United States Patent [19]
Taniuchi et al.

[11] Patent Number: 5,925,283
[45] Date of Patent: Jul. 20, 1999

[54] IONICALLY CONDUCTIVE POLYMERIC GEL ELECTROLYTE AND SOLID BATTERY CONTAINING THE SAME

[75] Inventors: Masahiro Taniuchi; Tomohiro Inoue; Toshiyuki Ohsawa, all of Tokyo; Keiichi Yokoyama, Sodegaura; Akio Hiwara, Sodegaura; Masahiro Toriida, Sodegaura, all of Japan

[73] Assignees: Mitsui Chemicals, Inc.; Ricoh Company, Ltd., both of Tokyo, Japan

[21] Appl. No.: 08/908,383

[22] Filed: Aug. 7, 1997

[30] Foreign Application Priority Data

Aug. 7, 1996 [JP] Japan .................................. 8-224534

[51] Int. Cl.$^6$ .............................. H01M 6/16; H01M 6/18
[52] U.S. Cl. ........................ 252/62.2; 429/300; 429/302; 429/303; 429/307; 429/310; 429/311; 429/313; 429/314; 429/321; 429/322; 429/323
[58] Field of Search ........................ 252/62.2; 429/190, 429/189, 192, 194, 197, 188, 300, 302, 303, 307, 310, 311, 313, 314, 321, 322, 323

[56] References Cited

U.S. PATENT DOCUMENTS

| | | | |
|---|---|---|---|
| 4,818,644 | 4/1989 | Armand | 429/192 |
| 4,840,856 | 6/1989 | Nakacho et al. | 429/192 |
| 5,006,431 | 4/1991 | Hope et al. | 429/192 |
| 5,009,970 | 4/1991 | Kronfli et al. | 429/192 |
| 5,037,712 | 8/1991 | Shackle et al. | 429/192 |
| 5,102,752 | 4/1992 | Hope et al. | 429/192 |
| 5,123,512 | 6/1992 | Nemoto et al. | 192/70.25 |
| 5,229,970 | 7/1993 | Lee et al. | 365/222 |
| 5,529,859 | 6/1996 | Shu et al. | 429/194 |
| 5,633,099 | 5/1997 | Yokoyama et al. | 262/62.2 |
| 5,648,011 | 7/1997 | Blonsky | 429/190 |

OTHER PUBLICATIONS

English language abstract of Japanese Patent No. JP–A–03024164A, Feb. 1991.

English language abstract of Japanese Patent No. JP–A–070320781A, Dec. 1995.

*Primary Examiner*—Alan Diamond
*Attorney, Agent, or Firm*—Birch, Stewart, Kolasch & Birch, LLP

[57] ABSTRACT

The present invention relates to an ionically conductive polymeric gel electrolyte for batteries having high ionic conductivity and sufficiently high solid strength. The invention has an object to provide a solid battery which prevents internal short-circuiting even if no diaphragm is used and which has high reliability, by using the ionically conductive polymeric gel electrolyte. Disclosed is an ionically conductive polymeric gel electrolyte, containing at least a polymer matrix, a non-aqueous electrolytic solution and an electrolytic salt, wherein at least one kind of a halogen-substituted carbonic ester is contained as a solvent of the non-aqueous electrolytic solution. Also disclosed is a solid battery having the ionically conductive polymeric gel electrolyte as a constituent.

17 Claims, No Drawings

IONICALLY CONDUCTIVE POLYMERIC GEL ELECTROLYTE AND SOLID BATTERY CONTAINING THE SAME

FIELD OF THE INVENTION

The present invention relates to novel gel electrolytes and solid batteries using the gel electrolytes.

BACKGROUND OF THE INVENTION

Batteries are each mainly constituted of a positive electrode, a negative electrode and an electrolytic solution. In order to prevent decrease of lifetime of batteries caused by leakage or vaporization of the electrolytic solution, containers of batteries have been desired to have structures of high rigidity, high sealing properties and excellent pressure resistance (e.g., cylindrical type, square type, coin type). Particularly these days, various forms have been required for batteries, and development of flat type batteries having large area has been made.

In this connection, solid batteries have been studied. As solid electrolytes contained in the solid batteries, various ceramics, inorganic conductive glasses (e.g., NASIKON, LISICON), and polymeric solid electrolytes composed of a solid solution of a polymer matrix and electrolytic salt have been studied. As for these materials, however, various problems have been pointed out. For example, the inorganic electrolytes show poor stability or they are restricted in the battery system. The polymeric solid electrolytes have low ionic conductivity or low diaphragm strength, though they show good processability. To cope with these problems, there have been disclosed, for example, polymeric solid electrolytes using polysiloxane (U.S. Pat. No. 5,123,512) or polyphosphazene (U.S. Pat. No. 4,840,856) as polymer matrix, and polymeric gel electrolytes using polyethylene oxide-crosslinked products (U.S. Pat. No. 5,037,712, No. 5,229,225, No. 5,009,970, No. 5,102,752), ethylene oxide copolymers (U.S. Pat. No. 4,818,644, Japanese Patent Laid-Open Publication No. 24164/1991), vinyl copolymers (Japanese Patent Laid-Open Publication No. 320781/1995) or epoxy resins (U.S. Pat. No. 5,006,431) as polymer matrix. These electrolytes, however, are still insufficient as polymeric solid electrolytes for batteries, from the viewpoints of ionic conductivity, film strength and stability.

OBJECT OF THE INVENTION

The present invention is intended to solve such problems shown in the solid electrolytes where conventional polymers are matrix as described above, and it is an object of the invention to provide an ionically conductive polymeric gel electrolyte for batteries, which has high ionic conductivity and sufficiently high solid strength. It is another object of the invention to provide a solid battery using the ionically conductive polymeric gel electrolyte, which is excellent in characteristics of preventing internal short-circuit even if no diaphragm is used and which has high reliability.

SUMMARY OF THE INVENTION

The ionically conductive polymeric gel electrolyte of the present invention is characterized in that this gel electrolyte comprises a polymer matrix, a solvent and an electrolytic salt, and that the solvent used for a non-aqueous electrolytic solution contains at least one kind of a halogen-substituted carbonic ester. In general, if a carbonic ester is used as a solvent of a non-aqueous electrolytic the solution of a polymeric gel electrolyte, elastic modulus of the resulting electrolyte for solid battery tends to be lower and the retention of the solvent is reduced.

The present inventors have earnestly studied to solve these problems, and as a result, they have found that use of at least one kind of a halogen-substituted carbonic ester as a solvent of the non-aqueous electrolytic solution makes it possible to improve the elastic modulus of the solid electrolyte and to improve the retention of the solvent without lowering the ionic conductivity. Based on this finding, the present invention has been accomplished.

DETAILED DESCRIPTION OF THE INVENTION

The ionically conductive polymeric gel electrolyte of the invention is described in detail hereinafter.

The polymeric gel electrolyte of the invention is of a homogeneous viscoelastic body as a whole which comprises a polymer matrix, a solvent and an electrolytic salt. In the present invention, a halogen-substituted carbonic ester having a relative dielectric constant of not less than 4.0 is preferably used as a solvent, because the ionic conductivity of the resulting polymeric gel electrolyte can be enhanced.

The halogen-substituted non-cyclic carbonic ester for use in the invention is represented by, for example, the following formula [I]:

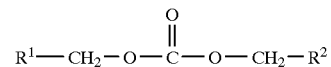

[I]

wherein $R^1$ and $R^2$ are each a halogen-substituted or unsubstituted alkyl group of 1 to 4 carbon atoms, hydrogen or halogen, with the proviso that at least one halogen is present in at least one of $R^1$ and $R^2$; and $R^1$ and $R^2$ may be the same or different.

When $R^1$ and $R^2$ in the formula [I] are each an unsubstituted alkyl group of 1 to 4 carbon atoms, the unsubstituted alkyl group is preferably methyl, ethyl or the like. When $R^1$ and $R^2$ are each a halogen-substituted alkyl group of 1 to 4 carbon atoms, the halogen-substituted alkyl group is preferably a group which is substituted with halogen at the 1- or more position, such as chloromethyl, 2-chloroethyl, dichloromethyl, 2,2-dichloroethyl, trichloromethyl, 2,2,2-trichloroethyl, pentachloromethyl, 2,2,3,3,3-pentachloropropyl, heptachloromethyl, 2,2,3,3,4,4,4-heptachlorobutyl, fluoromethyl, 2-fluoromethyl, difluoromethyl, 2,2-difluoroethyl, trifluoromethyl, 2,2,2-trifluoroethyl, pentafluoromethyl, 2,2,3,3,3-pentafluoropropyl, bromomethyl, 2-bromoethyl, dibromomethyl, 2,2-dibromoethyl, tribromomethyl, 2,2,2-tribromoethyl, iodomethyl or 2-iodoethyl. When $R^1$ and $R^2$ are each a halogen atom, examples of the halogen atoms include fluorine, chorine, bromine and iodine. Particularly preferable is a fluorine-substituted ester, because cycle properties of the resulting battery can be improved.

The halogen-substituted cyclic carbonic ester for use in the invention is, for example, a carbonic ester represented by the following formula [II]:

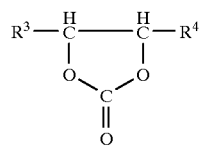

[II]

wherein $R^3$ and $R^4$ are each a halogen-substituted or unsubstituted alkyl group of 1 to 2 carbon atoms, hydrogen or halogen, with the proviso that at least one halogen is present in at least one of $R^3$ and $R^4$; and $R^3$ and $R^4$ may be the same or different.

When $R^3$ and $R^4$ in the formula [II] are each an unsubstituted alkyl group of 1 to 2 carbon atoms, the unsubstituted alkyl group is preferably methyl. When $R^3$ and $R^4$ are each a halogen-substituted alkyl group of 1 to 2 carbon atoms, the halogen-substituted alkyl group is preferably a group which is substituted with halogen at the 1- or more position, such as chloromethyl, dichloromethyl, trichloromethyl, fluoromethyl, difluoromethyl, trifluoromethyl, bromomethyl, dibromomethyl, tribromomethyl or iodomethyl. When $R^1$ and $R^2$ are each a halogen atom, examples of the halogen atoms include fluorine, chorine, bromine and iodine. Particularly preferable is a fluorine-substituted ester, because cycle properties of the resulting battery can be improved.

Further, use of the halogen-substituted carbonic ester contributes to improvement of flame retardance.

For improving the ionic conductivity, the halogen-substituted non-cyclic carbonic ester is particularly preferably employed.

Examples of the halogen-substituted non-cyclic carbonic esters having a relative dielectric constant of not less than 4.0 include methyl-2-chloroethyl carbonate, methyl-2,2,2-trichloroethyl carbonate, methyl-2,2,2-trifluoroethyl carbonate, di(2,2,2-trifluoroethyl) carbonate and methyl-2,2,3,3,3-pentafluoropropyl carbonate.

The halogen-substituted non-cyclic carbonic ester used in the invention is preferably one having a relative dielectric constant of not less than 6.0, and is more preferably one having a dielectric constant of not less than 7.0.

Examples of the halogen-substituted non-cyclic carbonic esters having a relative dielectric constant of not less than 6.0 and less than 7.0 include methyl-2-chloroethyl carbonate and methyl-2,2,3,3,3-pentafluoropropyl carbonate.

Examples of the halogen-substituted non-cyclic carbonic esters having a relative dielectric constant of not less than 7.0 include methyl-2,2,2-trifluoroethyl carbonate and di(2,2,2-trifluoroethyl) carbonate.

All of the halogen-substituted cyclic carbonic ester of the formula [II] have a relative dielectric constant of not less than 4.0; therefore all of them are preferable.

Examples of the halogen-substituted cyclic carbonic esters include fluoromethylethylene carbonate

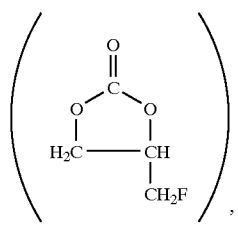

difluoromethylethylene carbonate

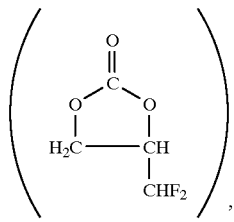

trifluoromethylethylene carbonate

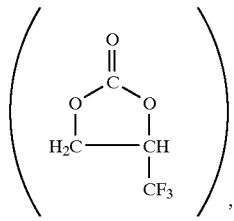

fluoroethylene carbonate, chloromethylethylene carbonate, dichloromethylethylene carbonate, trichloromethylethylene carbonate, chloroethylene carbonate, bromomethylethylene carbonate, dibromomethylethylene carbonate, tribromomethylethylene carbonate, bromoethylene carbonate, iodomethylethylene carbonate, diiodomethylethylene carbonate, triiodomethylethylene carbonate and iodoethylene carbonate.

In the present invention, the halogen-substituted carbonic esters may be used singly or in combination of two or more kinds.

By the use of the halogen-substituted non-cyclic carbonic ester, a gel electrolyte improved particularly in ionic conductivity, elastic modulus, retention of solvent and low-temperature ionic conductivity can be obtained, and besides a flame-retardant gel electrolyte can be also obtained. In the present invention, substituted cyclic esters can be incorporated as other solvents for forming the electrolytic solution in addition to the halogen-substituted carbonic ester. Examples of such solvents for forming the electrolytic solution include ethylene carbonate (EC) and propylene carbonate (PC). Other solvents include dimethyl carbonate, diethyl carbonate, γ-butylene carbonate, γ-butyrolactone, sulfolane, dioxolane, tetrahydrofuran, 2-methyltetrahydrofuran, methylethyl carbonate, dimethyl sulfoxide, 1,2-dimethoxyethane, 1,2-ethoxymethoxyethane, methyl glyme, methyl triglyme, methyl tetraglyme, ethyl glyme, ethyl diglyme and butyl diglyme. The solvents for forming the electrolytic solution, which are employable in the invention, are not limited to those examples. The above-mentioned solvents may be used singly or in combination.

Of the cyclic esters mentioned above, particularly preferable are cyclic carbonic esters such as EC and PC.

The amount of the halogen-substituted non-cyclic carbonic ester in the mixed solvent of the non-aqueous electrolytic solution is preferably 5 to 80% by volume, more preferably 20 to 70% by volume, particularly preferably 30 to 50% by volume.

The amount of the halogen-substituted cyclic carbonic ester in the mixed solvent of the non-aqueous electrolytic solution is preferably 20 to 95% by volume, more preferably 30 to 80% by volume, particularly preferably 50 to 70% by volume.

The gel electrolyte of the invention is, for example, a thermoplastic gel composition comprising a polymer (e.g., polyvinylidene fluoride, polyacrylonitrile or polyethylene oxide), a solvent and an electrolytic salt; or a gel composition comprising polysiloxane having an ethylene oxide chain in its side chains or a crosslinked polymer having an ethylene oxide chain in its side chains or main chains (e.g., polymer matrix crosslinked with urethane compounds, acrylic compounds or epoxy compounds), a solvent and an electrolytic salt. Of these, a gel composition having the crosslinked polymer is particularly effective.

The crosslinked polymer matrix is now described in detail. The polymerizable compound for use in the invention contains, in its molecule, a hetero atom other than a carbon atom, such as an oxygen atom, a nitrogen atom or a sulfur atom. The polymeric gel electrolyte is obtained by, for example, dissolving the hetero atom-containing polymerizable compound in a non-aqueous solvent (or electrolytic solution), followed by performing polymerization reaction. The polymerization reaction is conducted preferably in an inert gas atmosphere. There is no specific limitation on the polymerizable compound for use in the invention, and any compounds capable of undergoing polymerization reaction such as thermal polymerization or active light polymerization (photopolymerization) to produce polymers can be employed.

Examples of the polymerizable compounds for use in the invention include monofunctional and polyfunctional (meth) acrylate monomers, and prepolymers thereof. The term "(meth)acrylate" used herein means acrylate or methacrylate.

Examples of the monofunctional acrylates include alkyl (meth)acrylates, such as methyl (meth)acrylate, butyl (meth) acrylate, trifluoroethyl (meth)acrylate; alicyclic (meth) acrylates; hydroxyalkyl (meth)acrylates, such as hydroxyethyl acrylate and hydroxypropyl acrylate; hydroxypolyoxyalkylene (meth)acrylate, such as hydroxypolyoxyethylene (meth)acrylate and hydroxypolyoxypropylene (meth)acrylate; and alkoxyalkyl (meth)acrylates, such as methoxyethyl acrylate, ethoxyethyl acrylate and phenoxyethyl acrylate. In the above hydroxypolyoxyalkylene (meth)acrylates, the oxyalkylene group preferably has 1 to 4 carbon atoms. In the above alkoxyalkyl (meth)acrylates, the alkoxy group preferably has 1 to 4 carbon atoms.

Examples of other (meth)acrylates include ethylene glycol (meth)acrylates, such as methylethylene glycol (meth) acrylate, ethylethylene glycol (meth)acrylate, propylethylene glycol (meth)acrylate, phenylethylene glycol (meth) acrylate, methyldiethylene glycol (meth)acrylate, ethyldiethylene glycol (meth)acrylate, methylethoxydiethylene glycol acrylate, methoxydiethylene glycol methacrylate, methoxytriethylene glycol acrylate, methoxytriethylene glycol methacrylate and methoxytetraethylene glycol methacrylate; and propylene glycol (meth)acrylates, such as ethylpropylene glycol acrylate, butylpropylene glycol acrylate and methoxypropylene glycol acrylate.

The (meth)acrylates may contain a heterocyclic group. The heterocyclic group is a residual group of a heterocyclic ring containing a hetero atom such as oxygen, nitrogen or sulfur. There is no specific limitation on the kind of the heterocyclic group contained in the (meth)acrylates, but preferable are (meth)acrylates having a furfuryl group or a tetrahydrofurfuryl group, such as furfuryl (meth)acrylate or tetrahydrofurfuryl (meth)acrylate. Examples of other (meth) acrylates having a heterocyclic group include alkylene glycol acrylates having a furfuryl group or a tetrahydrofurfuryl group, such as furfurylethylene glycol (meth)acrylate, tetrahydrofurfurylethylene glycol (meth)acrylate, furfurylpropylene glycol (meth)acrylate and tetrahydrofurfurylpropylene glycol (meth)acrylate.

The (meth)acrylate compounds or the prepolymers thereof have a molecular weight of usually not more than 1,000, preferably not more than 500, more preferably not more than 300.

In case of a polymeric gel electrolyte obtained by the use of a (meth)acrylate monomer having a molecular weight of more than 1,000, the non-aqueous solvent easily oozes out. The (meth)acrylate compounds mentioned above may be used alone or in combination of two or more kinds.

The (meth)acrylate compound is used in an amount of usually not more than 50% by weight, preferably 5 to 40% by weight, more preferably 10 to 30% by weight, based on the amount of the non-aqueous electrolytic solution.

The polyfunctional (meth)acrylate compound is, for example, a monomer having two or more (meth)acryloyl groups or a prepolymer thereof. Examples of such polyfunctional (meth)acrylate compounds include ethylene glycol dimethacrylate, diethylene glycol di(meth)acrylate, tetraethylene glycol di(meth)acrylate, triethylene glycol di(meth) acrylate, tripropylene glycol diacrylate, EO-modified trimethylolpropane triacrylate, PO-modified trimethylolpropane triacrylate, butanediol (meth)acrylate, trimethylolpropane tri(meth)acrylate and dipentaerythritol hexa(meth)acrylate.

In the preparation of the crosslinked polymer matrix, a combination of a monofunctional monomer and a polyfunctional monomer is particularly preferably used.

If the monofunctional monomer and the polyfunctional monomer are used in combination and if the polyfunctional monomer is a polyfunctional (meth)acrylate compound, the polyfunctional (meth)acrylate compound is used in an amount of not more than 4% by weight, preferably 0.05 to 2% by weight, based on the amount of the non-aqueous electrolytic solution.

In the polymerization reaction of the above monomers, a polymerization initiator such as a photopolymerization initiator or a thermal polymerization initiator is generally employed.

Examples of the photopolymerization initiators include carbonyl compounds, such as benzoins (e.g., benzoin, benzoin methyl ether, benzoin ethyl ether, benzoin isopropyl ether, benzoin isobutyl ether, α-phenylbenzoin) and anthraquinones (e.g., anthraquinone, methylanthraquinone, chloroanthraquinone), other carbonyl compounds (e.g., benzyldiacetyl, acetophenone, benzophenone, methylbenzoyl formate); sulfur compounds, such as diphenyl sulfide and dithiocarbamate; halides of polycondensed cyclic hydrocarbons, such as α-chloromethylnaphthalene; dyes, such as acriflavine and fluorescein; metallic salts, such as iron chloride and silver chloride; and onium salts, such as p-methoxybenzenediazonium, hexafluorophosphate, diphenyliodonium and triphenylsulfonium. These photopolymerization initiators may be used singly or in combination of two or more kinds. Of the photopolymerization initiators, preferable are carbonyl compounds, sulfur compounds and onium salts.

Examples of the thermal polymerization initiators include azobisisobutyronitrile, azobisisovaleronitrile, benzoyl peroxide, lauroyl peroxide, ethyl methyl ketone peroxide, bis-(4-t-butylcyclohexyl) peroxydicarbonate and diisopropyl peroxydicarbonate. A sensitizing agent and a storage stabilizer can be optionally used in combination with the polymerization initiator. Further, the thermal polymerization initiator and the photopolymerization initiator may be used in combination.

Examples of the sensitizing agents preferably used in the invention include urea, nitrile compounds such as N,N-di-p-aminobenzonitrile, and phosphorus compounds such as tri-n-butylphosphine. Examples of the storage stabilizers preferably used in the invention include quaternary ammonium chloride, benzothiazole and hydroquinone. The polymerization initiator is used in an amount of usually 0.1 to 10% by weight, preferably 0.5 to 7% by weight, based on the total amount of the polymerizable compound. The sensitizing agent or the storage stabilizer is used in an amount of usually 0.1 to 5 parts by weight, based on 100 parts by weight of the polymerizable compound.

Gelation of the electrolyte of the invention can be achieved by pouring into a sealed container the non-aqueous electrolytic solution comprising a polymerizable composition containing the acrylate monomer, or by coating a substrate (e.g., film, metal or glass) with the non-aqueous electrolytic solution and performing polymerization reaction by means of heat or active light. Examples of the active lights generally used in the invention include visible light, ultraviolet light, electron rays and X rays. The resulting polymeric gel electrolyte independently is viscoelastic, and preferably has an elastic modulus of not less than $10^2$ dyne/cm when it is used to form a battery, while its ionic conductivity is maintained at not less than $10^{-3}$ S/cm. The polymeric gel electrolyte can effectively function as a polymeric electrolytic layer of a battery. The gelated electrolyte is made to be in the form of a film, a sheet, or a composite of the electrolyte with a part of other members (constituents) for forming a battery, to produce an article.

Examples of the electrolytic salts for use in the invention include Lewis acid complex salts, such as $LiBF_4$, $LiAsF_6$, $LiPF_6$ and $LiSbF_6$; and sulfonic acid electrolytic salts, such as $LiCF_3SO_3$, $LiN(CF_3SO_2)_2$, $LiC(CF_3SO_2)_3$, $LiC(CH_3)(CF_3SO_2)_2$, $LiCH(CF_3SO_2)2$, $LiCH_2(CF_3SO_2)$, $LiC_2F_5SO_3$, $LiN(C_2F_5SO_2)_2$, $LiB(CF_3SO_2)_2$ and $LiO(CF_3SO_2)$. There is no limitation to those examples. Other electrolytic salt includes $LiClO_4$, $LiCF_3CO_3$, $NaClO_3$, $NaBF_4$, $NaSCN$, $KBF_4$, $Mg(ClO_4)_2$ and $Mg(BF_4)2$. The electrolytic salts employable in the invention are not limited to those examples either, and any electrolytic salts used for the conventional non-aqueous electrolytic solutions can be employed. The electrolytic salts mentioned above may be used in combination.

The non-aqueous electrolytic solution is a solution of the electrolytic salt in the aforesaid non-aqueous solvent. The concentration of the electrolytic salt in the non-aqueous electrolytic solution is in the range of usually 1.0 to 7.0 mol per liter of the non-aqueous solvent, preferably 1.0 to 5.0 mol per liter of the non-aqueous solvent. The amount of the non-aqueous electrolytic solution is usually not less than 200% by weight, preferably 400 to 900% by weight, particularly preferably 500 to 800% by weight, based on the amount of the high-molecular weight compound (polymer) for forming the matrix. If the amount thereof is less than 200% by weight, the resulting electrolyte does not have a sufficiently high ionic conductivity. If the amount thereof exceeds 900% by weight, solidification of the non-aqueous electrolytic solution becomes difficult.

The polymeric gel electrolyte can be used for polymeric gel electrolytic layers of electrochemical elements, such as batteries, condensers, sensors, electrochromic devices and semiconductor devices.

Next, use of the polymeric gel electrolyte of the invention as a battery electrolyte is described in detail.

In general, a battery consists of a positive electrode made of a positive electrode active material, a negative electrode made of a negative electrode active material, and an electrolyte. By the use of the gel electrolyte of the invention as the battery electrolyte, batteries which have advantageous features unlike the conventional ones can be obtained. When the gel electrolyte of the invention is applied to batteries, the gel electrolyte itself can be made to have also a function of diaphragm. However, the gel electrolyte of the invention is desired to be united to diaphragm into one body for the purpose of producing a uniform electric field between the electrodes, improving strength of the electrolyte and enhancing reliability of the resulting batteries. This should be taken into consideration especially in secondary batteries.

Examples of the positive electrode active materials used for the battery of the invention include transition metal sulfide, such as $TiS_2$, $MoS_2$ and $Co_2S_5$; transition metal oxides, such as $V_2O_5$, $MnO_2$ and $CoO_2$; transition metal chalcogen compounds; and complex compounds of these metal compounds and Li (i.e., Li complex oxides), such as $LiMnO_2$, $LiMn_2O_4$, $LiCoO_2$, $LiNiO_2$, $LiCo_xNi_{1-x}O_2$ (0<x<1), $LiMn_{2-a}X_aO_4$ and $LiMn_{2-a-b}X_aY_bO_4$ (0<a<2, 0<b<2, 0<a+b<2). Examples of electroconductive materials include one-dimensional graphitization products (thermal polymerization products of organic materials); fluorocarbons; graphites; and electroconductive polymers having an electrical conductivity of not less than $10^{-2}$ S/cm, such as polyaniline, polypyrrole, polyazulene, polyphenylene, polyacetylene, polyphthalocyanine, poly-3-methylthiophene, polypyridine and polydiphenylbenzidine, and derivatives of these conductive polymers.

Examples of the negative electrode active materials used for the battery of the invention include metallic materials, such as lithium, lithium-aluminum alloy, lithium-tin alloy and lithium-magnesium alloy; carbons (including graphite type and non-graphite type); carbon-boron substituted substances ($BC_2N$); and intercalation materials capable of occluding lithium ion, such as tin oxide. Particular examples of the carbons include calcined graphites, calcined pitch, calcined coke, calcined synthetic polymers and calcined natural polymers. In the present invention, the following carbons are employed: (1) insulating or semiconductor carbons obtained by calcining synthetic polymers such as phenol resin and polyimide or natural polymers in a reducing atmosphere at 400 to 800° C.; (2) electroconductive carbons obtained by calcining coal, pitch, synthetic polymers or natural polymers in a reducing atmosphere at 800 to 1,300° C.; and (3) graphite type carbons, such as those obtained by calcining coke, pitch, synthetic polymers or natural polymers in a reducing atmosphere at not lower than 2,000° C., and natural graphites.

Examples of positive current collectors for use in the invention include metal sheets, metal foils, metal nets, punching metals, expanded metals, metal plated fibers, metallized wires, and nets or nonwoven fabrics made of metal-containing synthetic fibers. Examples of metals used for these positive current collectors include stainless steel, gold, platinum, nickel, aluminum, molybdenum and titanium. Of these, preferably used are aluminum, stainless steel and titanium, from the viewpoints of electrical conductivity, chemical stability, electrochemical stability, economical effects and processability.

Though the polymeric gel electrolyte of the invention can be per se used as diaphragm of batteries, it may be used after a filler is dispersed therein or after it is combined with a porous film (separator) to prepare a composite. Examples of the separators include glass fiber filters; nonwoven fabric filters made of fibers of polymers such as polyester, Teflon, Polyflon, polypropylene and polyethylene; and other nonwoven fabric filters made of mixtures of glass fibers and the above polymeric fibers.

It is preferable that the battery of the present invention is manufactured in the form of one united viscoelastic body from the polymeric gel electrolyte and other battery constituents (members) such as electrodes and diaphragm by a process comprising the steps of impregnating those members with a composition for forming polymeric gel electrolyte and performing polymerization under heating or irradiation with active light. Uniting of the polymeric gel electrolyte to battery members may be carried out member by member. Owing to the polymeric gel electrolyte and the battery members thus united, the electrode reaction at the positive or negative electrode and the ion movement can be smoothly made, whereby internal resistance of the battery can be markedly decreased.

Especially when the polymeric gel electrolyte containing the halogen-substituted carbonic ester is used as a battery constituent, batteries, which have small thickness, are free from short-circuit and leakage of solution, show excellent battery properties and are quite safe, can be obtained because of high elastic modulus of the polymeric gel electrolyte and good retention of the solvent.

EFFECT OF THE INVENTION

Claims 1 to 9 exert such an effect that an ionically conductive polymeric gel electrolyte, which is improved in elastic modulus and retention of solvent without bringing about decrease of ionic conductivity, can be obtained. Also, claims 1 to 9 exert such an effect that a gel solid electrolyte, which shows sufficiently high solid strength and high retention of solvent by virtue of a crosslinked polymer matrix used as the matrix, can be prepared.

Claim 10 exerts such an effect that a solid battery of sufficiently high solid strength, which has a small thickness and is free from solution leakage and short-circuit, can be prepared.

EXAMPLE

The present invention will be further described with reference to the following examples, but it should be construed that the invention is in no way limited to those examples.

The non-aqueous solvents and electrolytic salts used in the following examples are those of battery grade having been sufficiently purified to have water content of not more than 100 ppm and having been subjected to treatment of removing oxygen and nitrogen. In the examples, all of the operations were carried out in an inert gas atmosphere. The ionic conductivity was measured in the following manner using an ionic conductivity measuring cell at 25° C.

That is, a SUS cylindrical container (inner diameter: 20 mm), an inner surface of which was covered with an insulating tape except the inner bottom surface serving as a counter electrode, was filled with a solid electrolyte. Then, a SUS column-like material (diameter: 18 mm) serving as a working electrode was fixed by press to the surface of the solid electrolyte, to measure the ionic conductivity.

Example 1

Ionically Conductive Polymeric Solid Electrolyte (I)

In a non-aqueous solvent of propylene carbonate/ethylene carbonate/di(2,2,2-trifluoroethyl) carbonate (4/4/2, by volume) was dissolved $LiN(CF_3SO_2)_2$ in an amount of 2.0 mol per liter of the solvent, to prepare an electrolytic solution. This electrolytic solution of 80 parts by weight was heated to 60° C., and thereto was added 20 parts by weight of polyacrylonitrile. Then, the mixture thus obtained was cooled to 10° C. to solidify it. Measurement of the ionic conductivity of the obtained solid resulted in $2.7 \times 10^{-3}$ S/cm. The solid had an elastic modulus of $3.0 \times 10^3$ dyne/cm$^2$.

Comparative Example 1

Solidification of an electrolytic solution was carried out in the same manner as in Example 1, except that di(2,2,2-trifluoroethyl) carbonate of the non-aqueous solvent was replaced with dipropyl carbonate. The resulting solid had an ionic conductivity of $2.3 \times 10^{-3}$ S/cm and an elastic modulus of $8.0 \times 10^2$ dyne/cm$^2$.

Example 2

Ionically Conductive Polymeric Solid Electrolyte (II)

In a non-aqueous solvent of propylene carbonate/ethylene carbonate/methyl-2,2,2-trichloroethyl carbonate (relative dielectric constant: 4.9) (3/3/4, by volume) was dissolved $LiC(CF_3SO_2)_3$ in an amount of 1.8 mol per liter of the solvent, to prepare an electrolytic solution. This electrolytic solution of 85 parts by weight was heated to 60° C., and thereto was added 15 parts by weight of polyvinylidene fluoride. Then, the mixture thus obtained was cooled to 10° C. to solidify it. The resulting solid had an ionic conductivity of $2.4 \times 10^{-3}$ S/cm and an elastic modulus of $3.5 \times 10^3$ dyne/cm$^2$.

Comparative Example 2

Solidification of an electrolytic solution was carried out in the same manner as in Example 2, except that methyl-2,2,2-trichloroethyl carbonate of the non-aqueous solvent was replaced with diisopropyl carbonate (relative dielectric constant: 2.5). The resulting solid had an ionic conductivity of $1.9 \times 10^{-3}$ S/cm and an elastic modulus of $1.0 \times 10^3$ dyne/cm$^2$.

Example 3

Ionically Conductive Polymeric Solid Electrolyte (III)

In a non-aqueous solvent of ethylene carbonate/methyl-2,2,2-trifluoroethyl carbonate (1/1, by volume) was dissolved $LiPF_6$ in an amount of 2.0 mol per liter of the solvent, to prepare an electrolytic solution. In this electrolytic solution of 80 parts by weight were dissolved 20 parts by weight of methyldiethylene glycol methacrylate as a monofunctional monomer and 0.06 part by weight of benzoin isobutyl ether as a photopolymerization initiator, to prepare a photopolymerizable solution. The solution was introduced into the ionic conductivity measuring cell and irradiated with ultraviolet light by means of a high-pressure mercury vapor lamp to solidify the electrolytic solution. The resulting solid had an ionic conductivity of $3.0 \times 10^{-3}$ S/cm and an elastic modulus of $4.1 \times 10^3$ dyne/cm$^2$.

Comparative Example 3

Solidification of an electrolytic solution was carried out in the same manner as in Example 3, except that methyl-2,2,2-trifluoroethyl carbonate of the non-aqueous solvent was replaced with dimethoxyethane. The resulting solid had an ionic conductivity of $9.7 \times 10^{-4}$ S/cm and an elastic modulus of $6.0 \times 10^2$ dyne/cm$^2$.

Example 4
Ionically Conductive Polymeric Solid Electrolyte (IV)

In a non-aqueous solvent of propylene carbonate/ethylene carbonate/methyl-2-chloroethyl carbonate (2/3/5, by volume) was dissolved $LiCF_3SO_3$ in an amount of 1.6 mol per liter of the solvent, to prepare an electrolytic solution. In this electrolytic solution of 75 parts by weight were dissolved 15 parts by weight of diethylene glycol dimethacrylate and 0.05 part by weight of benzoin isopropyl ether as a photopolymerization initiator, to prepare a photopolymerizable solution. The solution was solidified in the same manner as in Example 3. The resulting solid had an ionic conductivity of $2.4 \times 10^{-3}$ S/cm and an elastic modulus of $3.8 \times 10^3$ dyne/cm$^2$.

Comparative Example 4

Solidification of an electrolytic solution was carried out in the same manner as in Example 4, except that methyl-2-chloroethyl carbonate of the non-aqueous solvent was replaced with dimethoxyethane. The resulting solid had an ionic conductivity of $2.2 \times 10^{-3}$ S/cm and an elastic modulus of $7.0 \times 10^2$ dyne/cm$^2$.

Example 5
Ionically Conductive Polymeric Solid Electrolyte (V)

In a non-aqueous solvent of propylene carbonate/ethylene carbonate/methyl-2,2,3,3,3-pentafluoropropyl carbonate (2/5/3, by volume) was dissolved $LiN(CF_3SO_2)_2$ in an amount of 2.0 mol per liter of the solvent, to prepare an electrolytic solution. In this electrolytic solution of 86 parts by weight were dissolved 13.8 parts by weight of ethyldiethylene glycol methacrylate as a monofunctional monomer, 0.2 part by weight of PO-modified trimethylolpropane triacrylate as a polyfunctional monomer and 0.05 part by weight of methylbenzoyl formate as a photopolymerization initiator, to prepare a photopolymerizable solution. The solution was solidified in the same manner as in Example 3. The resulting solid had an ionic conductivity of $2.7 \times 10^{-3}$ S/cm and an elastic modulus of $3.8 \times 10^3$ dyne/cm$^2$.

Comparative Example 5

Solidification of an electrolytic solution was carried out in the same manner as in Example 5, except that methyl-2,2,3,3,3-pentafluoropropyl carbonate of the non-aqueous solvent was replaced with dipropyl carbonate. The resulting solid had an ionic conductivity of $1.7 \times 10^{-3}$ S/cm and an elastic modulus of $5.6 \times 10^2$ dyne/cm$^2$.

Example 6
Ionically Conductive Polymeric Solid Electrolvte (VI)

In a non-aqueous solvent of propylene carbonate/ethylene carbonate/methyl-2,2,2-trifluoroethyl carbonate (3/3/4, by volume) was dissolved $LiBF_4$ in an amount of 1.8 mol per liter of the solvent, to prepare an electrolytic solution. In this electrolytic solution of 85 parts by weight were dissolved 14.9 parts by weight of methoxytriethylene glycol acrylate as a monofunctional monomer, 0.1 part by weight of dipentaerythritol hexamethacrylate as a polyfunctional monomer and 0.05 part by weight of methylbenzoyl formate as a photopolymerization initiator, to prepare a photopolymerizable solution. The solution was solidified in the same manner as in Example 3. The resulting solid had an ionic conductivity of $2.6 \times 10^{-3}$ S/cm and an elastic modulus of $3.5 \times 10^3$ dyne/cm$^2$.

Comparative Example 6

Solidification of an electrolytic solution was carried out in the same manner as in Example 6, except that methyl-2,2,2-trifluoroethyl carbonate of the non-aqueous solvent was replaced with dimethoxyethane. The resulting solid had an ionic conductivity of $2.3 \times 10^{-3}$ S/cm and an elastic modulus of $8.4 \times 10^2$ dyne/cm$^2$.

Example 7
Ionically Conductive Polymeric Solid Electrolyte (VII)

In a non-aqueous solvent of propylene carbonate/ethylene carbonate/methyl-2-chloroethyl carbonate (2/5/3, by volume) was dissolved $LiAsF_6$ in an amount of 2.0 mol per liter of the solvent, to prepare an electrolytic solution. In this electrolytic solution of 80 parts by weight were dissolved 14.7 parts by weight of methoxydiethylene glycol acrylate as a monofunctional monomer, 0.3 part by weight of diethylene glycol diacrylate as a polyfunctional monomer and 0.05 part by weight of methylbenzoyl formate as a photopolymerization initiator were dissolved, to prepare a photopolymerizable solution. The solution was solidified in the same manner as in Example 3. The resulting solid had an ionic conductivity of $3.2 \times 10^{-3}$ S/cm and an elastic modulus of $3.1 \times 10^3$ dyne/cm$^2$.

Example 8
Ionically Conductive Polymeric Solid Electrolvte (VIII)

In a non-aqueous solvent of propylene carbonate/ethylene carbonate/di(2,2,2-trifluoroethyl) carbonate (2/3/5, by volume) were dissolved $LiN(CF_3SO_2)_2$ in an amount of 1.8 mol per liter of the solvent and $LiPF_6$ in an amount of 0.2 mol per liter of the solvent, to prepare an equivalent mixed electrolytic solution. In this electrolytic solution of 85 parts by weight were dissolved 14.0 parts by weight of methyldiethylene glycol acrylate as a monofunctional monomer, 1.0 part by weight of trimethylolpropane triacrylate as a polyfunctional monomer and 0.05 part by weight of bis(4-t-butylcyclohexyl) peroxydicarbonate as a thermal polymerization initiator, to prepare a polymerizable solution. The solution was subjected to polymerization reaction at 50° C. to solidify the electrolytic solution. The resulting solid had an ionic conductivity of $3.4 \times 10^{-3}$ S/cm and an elastic modulus of $3.2 \times 10^3$ dyne/cm$^2$.

Comparative Example 7

Solidification of an electrolytic solution was carried out in the same manner as in Example 7, except that di(2,2,2-trifluoroethyl) carbonate of the non-aqueous solvent was replaced with diisopropyl carbonate. The resulting solid had an ionic conductivity of $2.0 \times 10^{-3}$ S/cm and an elastic modulus of $7.3 \times 10^2$ dyne/cm$^2$.

Example 9
Ionically Conductive Polymeric Solid Electrolyte (IX)

In a non-aqueous solvent of propylene carbonate/ethylene carbonate/methyl-2-chloroethyl carbonate (3/3/4, by volume) were dissolved $LiCF_3SO_3$ in an amount of 1.6 mol per liter of the solvent and $LiBF_4$ in an amount of 0.2 mol per liter of the solvent, to prepare an equivalent mixed electrolytic solution. In this electrolytic solution of 75 parts by weight were dissolved 20 parts by weight of ethoxydiethylene glycol methacrylate as a monofunctional monomer, 5 parts by weight of diethylene glycol dimethacrylate as a polyfunctional monomer and 0.05 part by weight of benzoin isopropyl ether as a photopolymerization initiator, to prepare a photopolymerizable solution. The solution was solidified in the same manner as in Example 3. The resulting solid had an ionic conductivity of $2.4 \times 10^{-3}$ S/cm and an elastic modulus of $2.9 \times 10^3$ dyne/cm$^2$.

Example 10
Ionically Conductive Polymeric Solid Electrolyte (X)

In a non-aqueous solvent of propylene carbonate/di(2,2,2-trifluoroethyl) carbonate (6/4, by volume) were dissolved LiN(CF$_3$SO$_2$)$_2$ in an amount of 1.5 mol per liter of the solvent and LiAsF$_6$ in an amount of 0.5 mol per liter of the solvent, to prepare an equivalent mixed electrolytic solution. In this electrolytic solution of 85 parts by weight were dissolved 14.0 parts by weight of methyldiethylene glycol acrylate as a monofunctional monomer and 1.0 part by weight of trimethylolpropane triacrylate as a polyfunctional monomer, to prepare a polymerizable solution. The solution was irradiated with electron rays to solidify the solution. The resulting solid had an ionic conductivity of $3.8 \times 10^{-3}$ S/cm and an elastic modulus of $3.6 \times 10^3$ dyne/cm$^2$.

Example 11
Ionically Conductive Polymeric Solid Electrolvte (XI)

In a non-aqueous solvent of trifluoromethylethylene carbonate/ethylene carbonate (7/3, by volume) were dissolved LiPF$_6$ in an amount of 1.8 mol per liter of the solvent, to prepare an electrolytic solution. In this electrolytic solution of 86 parts by weight were dissolved 13.8 parts by weight of ethyldiethylene glycol acrylate as a monofunctional monomer, 0.2 part by weight of trimethylolpropane triacrylate as a polyfunctional monomer and 0.06 part by weight of benzoin isopropyl ether as a photopolymerization initiator, to prepare a photopolymerizable solution. The solution was solidified in the same manner as in Example 3. The resulting solid had an ionic conductivity of $1.8 \times 10^{-3}$ S/cm and an elastic modulus of $1.4 \times 10^4$ dyne/cm$^2$.

Example 12
Ionically Conductive Polymeric Solid Electrolvte (XII)

In a non-aqueous solvent of difluoromethylethylene carbonate/methyl-2,2,2-trifluoroethyl carbonate (5/5, by volume) were dissolved LiPF$_6$ in an amount of 1.5 mol per liter of the solvent, to prepare an electrolytic solution. In this electrolytic solution of 86 parts by weight were dissolved 13.8 parts by weight of ethyldiethylene glycol acrylate as a monofunctional monomer, 0.2 part by weight of trimethylolpropane triacrylate as a polyfunctional monomer and 0.06 part by weight of benzoin isopropyl ether as a photopolymerization initiator, to prepare a photopolymerizable solution. The solution was solidified in the same manner as in Example 3. The resulting solid had an ionic conductivity of $2.8 \times 10^{-3}$ S/cm and an elastic modulus of $4.0 \times 10^3$ dyne/cm$^2$.

Example 13

The gel electrolytes obtained in Examples 1 to 12 and Comparative Examples 1 to 7 were allowed to stand in an inert gas atmosphere, to evaluate retention of the solvent in each gel electrolyte. The results are set forth in Tables 1 and 2.

Example 14
Evaluation of Negative Electrode Battery Properties

To a solution obtained by dissolving 2 parts by weight of polyvinylidene fluoride in 58 parts by weight of N-methylpyrrolidone was added 40 parts by weight of coke having been calcined at 2,500° C., and they were mixed by roll milling in an inert atmosphere to prepare a coating dispersion for negative electrode. The dispersion was applied onto a copper foil (thickness: 20 $\mu$m) by means of a wire bar in the atmosphere and dried at 100° C. for 15 minutes to prepare an electrode having a film thickness of 60 $\mu$m. Then, a charge and discharge test was performed using the above electrode as a negative electrode, a Li plate as a counter electrode and each of the gel electrolytes prepared in Examples 1 to 12 and Comparative Examples 1 to 7. The charge and discharge test was carried out in the following manner. Using a charge and discharge measuring device of HJ-201B (available from Hokuto Denko K.K.), a constant current of 1.5 mA was applied to the gel electrolyte until a change of the battery voltage became 0 V, then a constant voltage was applied for 3 hours, to charge the battery. After one hour, the battery was discharged at a current of 1.5 mA so that the battery voltage became 0.8 V. These charge and discharge operations were repeated to evaluate cycle properties of the negative electrode battery. The results are set forth in Tables 1 and 2.

TABLE 1

|  | Ionic Conductivity (S/cm) | Elastic Modulus (dyne/cm$^2$) | Retention of Solvent | Battery Energy Density (mAh/cc) (initial period: 30 cycles) | Battery Property (after 300 cycles) |
|---|---|---|---|---|---|
| Ex. 1 | $2.7 \times 10^{-3}$ | $3.0 \times 10^3$ | BB | 260 | BB |
| Ex. 2 | $2.4 \times 10^{-3}$ | $3.5 \times 10^3$ | BB | 265 | BB |
| Ex. 3 | $3.0 \times 10^{-3}$ | $4.1 \times 10^3$ | BB | 267 | BB |
| Ex. 4 | $2.4 \times 10^{-3}$ | $3.8 \times 10^3$ | AA | 273 | AA |
| Ex. 5 | $2.7 \times 10^{-3}$ | $3.8 \times 10^3$ | AA | 254 | AA |
| Ex. 6 | $2.5 \times 10^{-3}$ | $3.5 \times 10^3$ | AA | 270 | AA |
| Ex. 7 | $3.2 \times 10^{-3}$ | $3.1 \times 10^3$ | BB | 265 | AA |
| Ex. 8 | $3.4 \times 10^{-3}$ | $3.2 \times 10^3$ | AA | 258 | AA |
| Ex. 9 | $2.4 \times 10^{-3}$ | $2.9 \times 10^3$ | BB | 261 | BB |
| Ex. 10 | $3.4 \times 10^{-3}$ | $3.2 \times 10^3$ | AA | 270 | AA |
| Ex. 11 | $1.8 \times 10^{-3}$ | $1.4 \times 10^4$ | AA | 245 | BB |
| Ex. 12 | $2.8 \times 10^{-3}$ | $4.0 \times 10^3$ | AA | 250 | BB |

Remarks:
"AA" means excellent.
"BB" means fairly good.
"CC" means good.
"DD" means poor.

TABLE 2

|  | Ionic Conductivity (S/cm) | Elastic Modulus (dyne/cm$^2$) | Retention of Solvent | Battery Energy Density (mAh/cc) (initial period: 30 cycles) | Battery Property (after 300 cycles) |
|---|---|---|---|---|---|
| Comp. Ex. 1 | $2.3 \times 10^{-3}$ | $8.0 \times 10^2$ | DD | 260 | DD |
| Comp. Ex. 2 | $1.9 \times 10^{-3}$ | $1.0 \times 10^3$ | DD | 258 | DD |
| Comp. Ex. 3 | $9.7 \times 10^{-4}$ | $6.5 \times 10^2$ | DD | 232 | CC |
| Comp. Ex. 4 | $2.2 \times 10^{-3}$ | $7.0 \times 10^2$ | DD | 270 | BB |
| Comp. Ex. 5 | $1.7 \times 10^{-3}$ | $5.6 \times 10^2$ | CC | 248 | BB |
| Comp. Ex. 6 | $2.3 \times 10^{-3}$ | $8.4 \times 10^2$ | CC | 265 | AA |
| Comp. Ex. 7 | $2.0 \times 10^{-3}$ | $7.3 \times 10^2$ | CC | 250 | BB |

Remarks:
"AA" means excellent.
"BB" means fairly good.
"CC" means good.
"DD" means poor.

What is claimed is:

1. An ionically conductive polymeric gel electrolyte containing at least a crosslinked polymer matrix, a non-aqueous electrolytic solution and an electrolytic salt, wherein at least one halogen-substituted carbonic ester is contained as a solvent of the non-aqueous electrolytic solution.

2. An ionically conductive polymeric gel electrolyte containing at least a polymer matrix, a non-aqueous electrolytic solution and an electrolytic salt, wherein at least one halogen-substituted non-cyclic carbonic ester is contained as a solvent of the non-aqueous electrolytic solution.

3. The ionically conductive polymeric gel electrolyte as claimed in claim 1 or claim 2, wherein the solvent of the non-aqueous electrolytic solution contains the halogen-substituted carbonic ester and a cyclic carbonic ester.

4. The ionically conductive polymeric gel electrolyte as claimed in claim 1 or 2, wherein the halogen-substituted carbonic ester has a relative dielectric constant of not less than 4.0.

5. The ionically conductive polymeric gel electrolyte as claimed in claim 1, wherein the non-aqueous electrolytic solution is contained in an amount of at least 200% by weight based on the amount of the polymer matrix.

6. The ionically conductive polymeric gel electrolyte as claimed in claim 5, wherein the non-aqueous electrolytic solution is contained in an amount of 400 to 900% by weight based on the amount of the polymer matrix.

7. The ionically conductive polymeric gel electrolyte as claimed in claim 1, wherein the polymer matrix is a polymer of an acrylate monomer comprising at least one alkylene oxide group.

8. A solid battery having, as a constituent, the ionically conductive polymeric gel electrolyte as claimed in claim 1.

9. The ionically conductive polymeric gel electrolyte as claimed in claim 1, wherein the halogen-substituted carbonic ester is a halogen substituted non-cyclic carbonic ester represented by the following formula (I) or a halogen-substituted cyclic carbonic ester represented by the following formula (II);

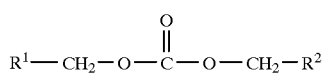
(I)

wherein $R^1$ and $R^2$ are each a halogen-substituted or unsubstituted alkyl group of 1 to 4 carbon atoms, hydrogen or halogen, with the proviso that at least one halogen is present in at least one of $R^1$ or $R^2$;

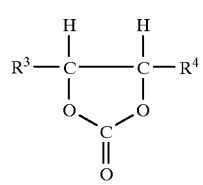
(II)

wherein $R^3$ and $R^4$ are each a halogen-substituted or unsubstituted alkyl group of 1 to 2 carbon atoms, hydrogen or halogen, with the proviso that at least one halogen is present in at least one of $R^3$ or $R^4$.

10. The ionically conductive polymeric gel electrolyte as claimed in claim 9, wherein the halogen-substituted carbonic ester of the formula (I) or the formula (II) is a fluorine-substituted carbonic ester.

11. The ionically conductive polymeric gel electrolyte as claimed in claim 2, wherein said at least one halogen substituted non-cyclic carbonic ester is represented by the following formula (I):

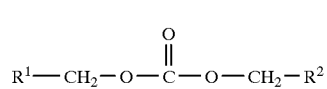
(I)

wherein $R^1$ and $R^2$ are each a halogen-substituted or unsubstituted alkyl group of 1 to 4 carbon atoms, hydrogen or halogen, with the proviso that at least one halogen is present in at least one of $R^1$ or $R^2$.

12. The ionically conductive polymeric gel electrolyte as claimed in claim 3, wherein the halogen-substituted carbonic ester is a halogen substituted non-cyclic carbonic ester represented by the following formula (I) or a halogen-substituted cyclic carbonic ester represented by the following formula (II);

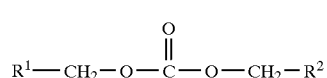
(I)

wherein $R^1$ and $R^2$ are each a halogen-substituted or unsubstituted alkyl group of 1 to 4 carbon atoms, hydrogen or halogen, with the proviso that at least one halogen is present in at least one of $R^1$ or $R^2$;

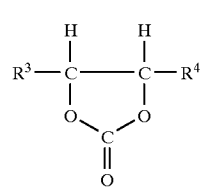
(II)

wherein $R^3$ and $R^4$ are each a halogen-substituted or unsubstituted alkyl group of 1 to 2 carbon atoms, hydrogen or halogen, with the proviso that at least one halogen is present in at least one of $R^3$ or $R^4$.

13. The ionically conductive polymeric gel electrolyte as claimed in claim 12, wherein the halogen-substituted carbonic ester of the formula (I) or the formula (II) is a fluorine-substituted carbonic ester.

14. The ionically conductive polymeric gel electrolyte as claimed in claim 3, wherein the halogen-substituted non-cyclic carbonic ester is present in the solvent of the non-aqueous electrolytic solution in an amount of 5 to 80% by volume.

15. The ionically conductive polymeric gel electrolyte as claimed in claim 3, wherein the cyclic carbonic ester is present in the solvent of the non-aqueous electrolytic solution in an amount of 20 to 95% by volume.

16. The ionically conductive polymeric gel electrolyte as claimed in claim 4, wherein the halogen-substituted carbonic ester is a halogen substituted non-cyclic carbonic ester represented by the following formula (I) or a halogen-substituted cyclic carbonic ester represented by the following formula (II);

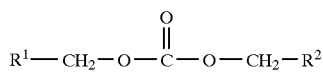
(I)

wherein $R^1$ and $R^2$ are each a halogen-substituted or unsubstituted alkyl group of 1 to 4 carbon atoms, hydrogen or halogen, with the proviso that at least one halogen is present in at least one of $R^1$ or $R^2$;

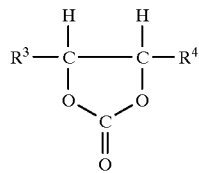
(II)

wherein $R^3$ and $R^4$ are each a halogen-substituted or unsubstituted alkyl group of 1 to 2 carbon atoms, hydrogen or halogen, with the proviso that at least one halogen is present in at least one of $R^3$ or $R^4$.

17. The ionically conductive polymeric gel electrolyte as claimed in claim 16, wherein the halogen-substituted carbonic ester of the formula (I) or the formula (II) is a fluorine-substituted carbonic ester.

* * * * *